(12) United States Patent
Matsui et al.

(10) Patent No.: US 11,837,257 B2
(45) Date of Patent: Dec. 5, 2023

(54) ELECTRONIC DEVICE AND CONTROL METHODS THEREOF

(71) Applicant: CANON KABUSHIKI KAISHA, Tokyo (JP)

(72) Inventors: Yuzo Matsui, Tokyo (JP); Jun Otsuki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 67 days.

(21) Appl. No.: 17/578,900

(22) Filed: Jan. 19, 2022

(65) Prior Publication Data
US 2022/0238138 A1  Jul. 28, 2022

(30) Foreign Application Priority Data

Jan. 22, 2021  (JP) ................. 2021-008939

(51) Int. Cl.
*G11B 20/10* (2006.01)
*H04N 9/804* (2006.01)

(52) U.S. Cl.
CPC ..... *G11B 20/10527* (2013.01); *H04N 9/8042* (2013.01)

(58) Field of Classification Search
CPC .......... G11B 20/10527; H04N 9/8042; H04N 5/765; H04N 9/8205; H04N 5/2621; H04N 5/445; H04N 5/9203; H04N 5/9204; H04N 7/0806; H04N 7/081; H04N 7/0881
USPC ....................................... 386/239
See application file for complete search history.

(56) References Cited

U.S. PATENT DOCUMENTS

| 2009/0125673 A1* | 5/2009 | Ito ............................. G11C 7/22 711/E12.001 |
| 2009/0276570 A1* | 11/2009 | Cheng ................. G06F 11/3433 711/E12.001 |
| 2009/0304360 A1* | 12/2009 | Morinaga ............ H04N 9/7921 386/231 |
| 2014/0125841 A1* | 5/2014 | Tanaka ................... H04N 5/772 348/231.2 |
| 2020/0413531 A1* | 12/2020 | Wallash ................. H01L 24/48 |

FOREIGN PATENT DOCUMENTS

JP  2013-258469 A  12/2013

* cited by examiner

*Primary Examiner* — Thai Q Tran
*Assistant Examiner* — Nienru Yang
(74) *Attorney, Agent, or Firm* — Cowan, Liebowitz & Latman, P.C.

(57) ABSTRACT

An electronic device determines a transfer mode to be used to communicate with a recording medium that has first and second transfer modes. The second transfer mode does not guarantee a minimum transfer speed but a higher transfer speed than the minimum transfer speed in the first mode is capable. If the medium supports the second transfer mode, the device determines that the first transfer mode is to be used when the minimum transfer speed is higher than a necessary transfer speed for data that is to be recorded through the communication with the recording medium and that the second transfer mode is to be used when the minimum transfer speed is not higher than the necessary transfer speed. If the medium does not support the second transfer mode, the device determines that the first transfer mode is to be used.

20 Claims, 6 Drawing Sheets

ELECTRONIC DEVICE AND CONTROL METHODS THEREOF

BACKGROUND OF THE INVENTION

Field of the Invention

The present invention relates to an electronic device and control methods thereof, and particularly relates to an electronic device in which a recording medium is used, and control methods thereof.

Description of the Related Art

In electronic devices having an image capture function, such as digital cameras and smartphones, memory cards are widespread as recording media for image data obtained using the image capture function. Furthermore, some memory cards have a plurality of transfer modes with different data transfer speeds (Japanese Patent Laid-Open No. 2013-258469).

If the data rate of image data to be recorded or played back is higher than the memory card transfer speed, there are cases in which the image data cannot be recorded/played back properly or the operation of an electronic device slows down. Thus, for memory cards having a plurality of transfer modes with different transfer speeds, it is necessary to select the appropriate transfer mode.

For example, in a case in which a memory card has a first transfer mode in which a minimum transfer speed is guaranteed, and a second transfer mode in which a minimum transfer speed is not guaranteed and a maximum transfer speed is higher than the minimum transfer speed in the first mode is capable, it is important to switch appropriately between stable transfer and high-speed transfer. This problem applies not only to electronic devices that capture images but to electronic devices that generate and record data according to any appropriate method.

SUMMARY OF THE INVENTION

In one aspect thereof, the present invention provides an electronic device and control methods thereof that allow a recording medium having a plurality of transfer modes with different transfer speed characteristics to be appropriately used.

According to an aspect of the present invention, there is provided an electronic device that can perform communication with a recording medium that has a first transfer mode in which a minimum transfer speed is guaranteed, and a second transfer mode in which a minimum transfer speed is not guaranteed and a higher transfer speed than the minimum transfer speed in the first mode is capable, the electronic device comprising: a controller that communicates with a connected recording medium; and one or more processors that execute a program and thereby function as a determination unit that determines a transfer mode to be used by the controller for the communication, wherein: if the connected recording medium supports the second transfer mode, the determination unit determines the use of the first transfer mode as the transfer mode when the minimum transfer speed is higher than a necessary transfer speed for data that is to be recorded through the communication with the recording medium, and determines the use of the second transfer mode as the transfer mode when the minimum transfer speed is not higher than the necessary transfer speed; and if the connected recording medium does not support the second transfer mode, the determination unit determines the use of the first transfer mode as the transfer mode.

According to another aspect of the present invention, there is provided a control method for an electronic device that can perform communication with a recording medium that has a first transfer mode in which a minimum transfer speed is guaranteed, and a second transfer mode in which a minimum transfer speed is not guaranteed and a higher transfer speed than the minimum transfer speed in the first mode is capable, the control method comprising: determining a transfer mode to be used for the communication with a connected recording medium, wherein the determining includes: if the connected recording medium supports the second transfer mode, determining the use of the first transfer mode as the transfer mode when the minimum transfer speed is higher than a necessary transfer speed for data that is to be recorded through the communication with the recording medium, and determining the use of the second transfer mode as the transfer mode when the minimum transfer speed is not higher than the necessary transfer speed; and if the connected recording medium does not support the second transfer mode, determining the use of the first transfer mode as the transfer mode.

According to a further aspect of the present invention, there is provided a non-transitory computer-readable storage medium having stored therein a program for causing a computer to execute each step of a control method for an electronic device that can perform communication with a recording medium that has a first transfer mode in which a minimum transfer speed is guaranteed, and a second transfer mode in which a minimum transfer speed is not guaranteed and a higher transfer speed than the minimum transfer speed in the first mode is capable, the control method comprising: determining a transfer mode to be used for the communication with a connected recording medium, wherein the determining includes: if the connected recording medium supports the second transfer mode, determining the use of the first transfer mode as the transfer mode when the minimum transfer speed is higher than a necessary transfer speed for data that is to be recorded through the communication with the recording medium, and determining the use of the second transfer mode as the transfer mode when the minimum transfer speed is not higher than the necessary transfer speed; and if the connected recording medium does not support the second transfer mode, determining the use of the first transfer mode as the transfer mode.

Further features of the present invention will become apparent from the following description of exemplary embodiments (with reference to the attached drawings).

DESCRIPTION OF THE EMBODIMENTS

Figure 1:
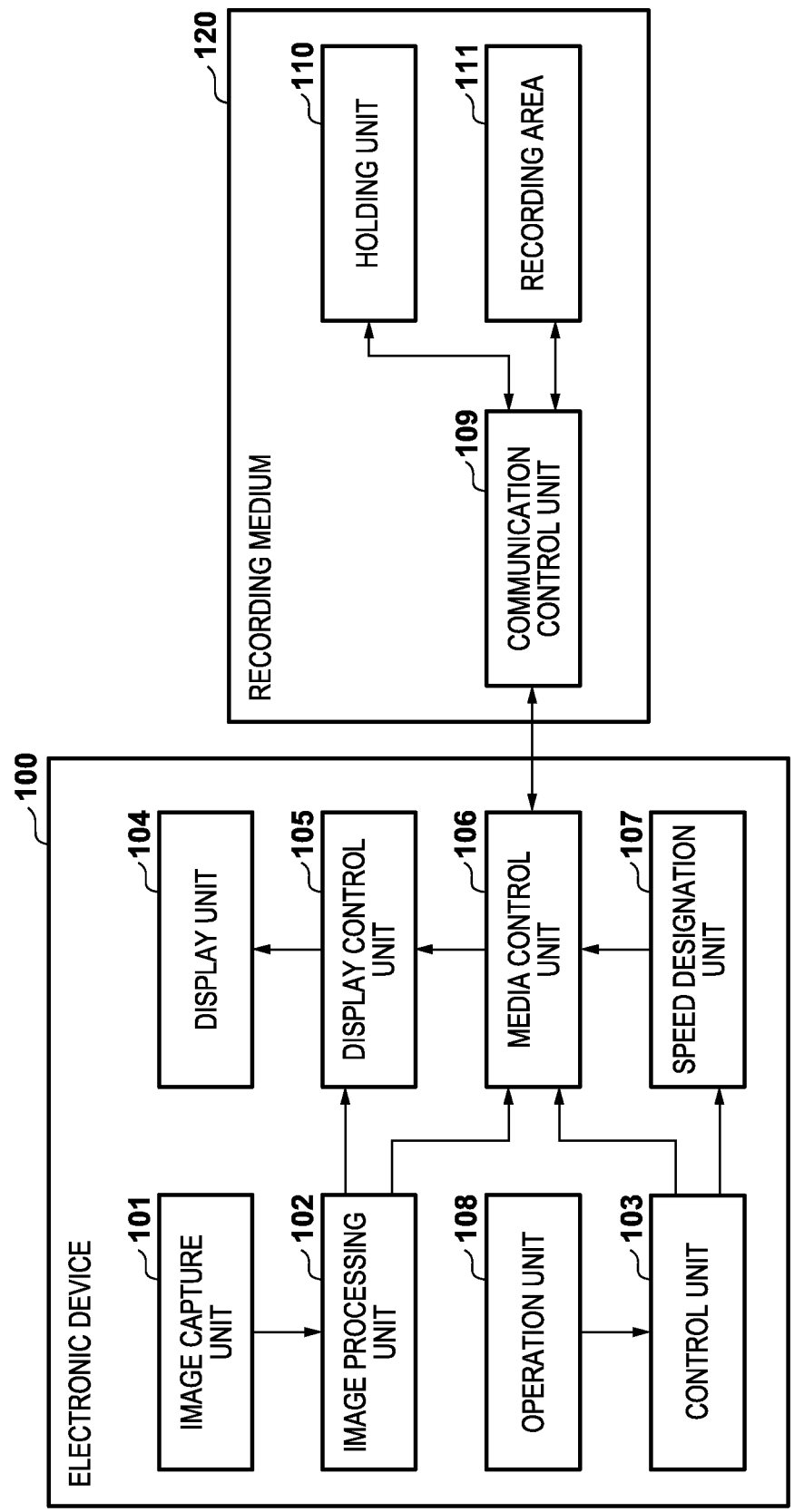
FIG. 1 is a block diagram illustrating an example of functional configurations of an electronic device and a recording medium according to embodiments.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that, in the following embodiments, a case in which the present invention is implemented using an electronic device having an image capture function, or more specifically, a digital camera, which is an image capture apparatus, will be described. However, the image capture function is not required in the present invention. The present invention can be implemented using various electronic devices, such as computer devices (personal computers, tablet computers, media players, PDAs, etc.), portable telephones, smartphones, game machines, robots, drones, and drive recorders.

First Embodiment

FIG. 1 is a block diagram illustrating an example of functional configurations of an electronic device 100 and a recording medium 120 that can be attached to and detached from the electronic device 100. The electronic device 100 records (writes) data to and plays back (reads) data from the recording medium 120 connected thereto by communicating with the recording medium 120 via a media control unit 106.

In this embodiment, the electronic device 100 is a digital camera, and the data includes moving-image data and still-image data, for example. Furthermore, description is provided regarding that the recording medium 120 is a memory card (SD Express card) having a bus interface conforming to SD Express. Note that microSD Express cards are also regarded as being included among SD Express cards. Furthermore, the media control unit 106 has an SD Express host function for supporting both the SD and PCIe interfaces.

An SD Express card has a first transfer mode and a second transfer mode. The first transfer mode is a transfer mode in which a minimum transfer speed is guaranteed but having a low maximum transfer speed. Furthermore, the second transfer mode is a transfer mode in which a minimum transfer speed is not guaranteed but a higher transfer speed than the minimum transfer speed guaranteed in the first transfer mode is capable. In such a manner, an SD Express card is one example of a memory card having a plurality of transfer modes with different transfer-speed characteristics.

In the following description, the first transfer mode is a transfer mode (SD mode) in which a bus interface conforming to UHS-1 is used, and the second transfer mode is a transfer mode (PCIe mode) in which a bus interface conforming to SD Express is used. Note that the SD Express bus interface is based on PCI Express (PCIe).

The bus interfaces to be used in the plurality of transfer modes of the recording medium 120 may be those conforming to other specifications. For example, the bus interface for the first transfer mode may conform to UHS-II or UHS-III.

An image capture unit 101 includes an imaging optical system and an image sensor that is a CMOS image sensor, for example. A plurality of pixels are arrayed in the image sensor, and the image sensor generates a group of electric signals (image signal) corresponding to an optical image formed by the imaging optical system by photoelectrically converting the optical image using the plurality of pixels. The image capture unit 101 outputs the image signal to an image processing unit 102.

The image processing unit 102 applies predetermined image processing to the image signal output from the image capture unit 101 to generate signals and image data, and to acquire and/or generate various types of information. Signals, image data, and information generated by the image processing unit 102 are output to a display control unit 105, the media control unit 106, a control unit 103, etc. For example, the image processing unit 102 may be a dedicated hardware circuit such as an ASIC that is designed so as to realize one or more specific functions, or may have a configuration such that a programmable processor such as a DSP realizes one or more specific functions by executing software.

Here, the image processing applied by the image processing unit 102 includes preprocessing, color interpolation processing, correction processing, detection processing, data processing, evaluation value calculation processing, special effects processing, etc.

The preprocessing includes signal amplification, reference level adjustment, defective pixel correction, A/D conversion, etc.

The color interpolation processing is processing for interpolating values of color components that cannot be obtained during image shooting, and is also called demosaic processing or synchronization processing.

The correction processing includes white-balance adjustment, gradation correction (gamma processing), processing for correcting the influences of vignetting and the optical aberration of the image capture unit 101, processing for correcting color, etc.

The detection processing includes the detection of feature regions (for example, face regions and human-body regions) and the movement thereof, human recognition processing, etc.

The data processing includes composition processing, scaling processing, encoding/decoding processing, header information generation processing, etc. Display data and recording data are generated as a result of the data processing.

The evaluation value calculation processing includes the generation of signals and evaluation values to be used for automatic focus detection (AF), processing for calculating evaluation values to be used for automatic exposure control (AE), etc.

The special effects processing includes the addition of blur, the changing of color tone, rewriting processing, etc.

Note that these are examples of image processing that can be applied by the image processing unit 102, and these examples do not limit the image processing applied by the image processing unit 102.

The term "operation unit 108" is used to collectively refer to input devices (one or more buttons, switches, dials, etc.) that are provided to allow a user to input various instructions to the electronic device 100. The input devices constituting the operation unit 108 each have a name corresponding to the function allocated thereto. For example, the operation unit 108 includes a release switch, a moving-image recording switch, an image-shooting mode selection dial for selecting the image-shooting mode, a menu button, a direction key, an enter key, etc. The release switch is a switch for recording still images, and the control unit 103 recognizes a half-pressed state and a full-pressed state of the release switch as an image-shooting preparation instruction and an image-shooting start instruction, respectively. Furthermore, the control unit 103 recognizes the depression of the moving-image recording switch in an image-shooting standby state as a moving-image recording start instruction, and recognizes the depression of the moving-image recording switch during the recording of a moving image as a recording stop instruction. Note that the function allocated to an input device may be changed. Furthermore, the input devices may be software buttons or keys realized using a touchscreen. The operation unit 108 may also include input devices supporting contactless input methods, such as voice input and eye-controlled input.

The control unit 103 includes a programmable processor (CPU), a ROM, and a RAM. The CPU controls the operations of the functional blocks of the electronic device 100 and realizes the functions of the electronic device 100 by loading one or more programs stored in the ROM to the RAM and executing the programs. For example, the ROM is rewritable, and stores programs that can be executed by the CPU, setting values of the electronic device 100, GUI data, etc. The RAM is used to load programs to be executed by the CPU, and to store values that are necessary during the execution of programs. Note that, while not shown in the drawing, the control unit 103 is connected to each of the functional blocks illustrated in the drawing.

Furthermore, the control unit 103 executes processing in accordance with user instructions provided via the operation unit 108. For example, if an instruction to switch the operation mode of the electronic device 100 is input, the control unit 103 switches the operation mode of the electronic device 100. The electronic device 100 has a plurality of operation modes including a moving-image recording mode, a still-image recording mode, and a playback mode, for example. The control unit 103 notifies the media control unit 106 and a speed designation unit 107 of the operation mode to which switching was performed.

A display unit 104 is a touchscreen, for example. The display unit 104 displays the display data input thereto from the display control unit 105. For example, the display data is moving-image data, still-image data, or GUI data. GUIs include GUIs, such as a menu screen, that can be operated, and GUIs indicating information regarding the electronic device 100.

The display control unit 105 converts data input thereto from the image processing unit 102 and the media control unit 106 into a format suitable for the display unit 104, and outputs the converted data to the display unit 104.

For example, the media control unit 106 is an SD host controller, and based on control by the control unit 103, supplies control signals such a clock to the recording medium 120 and executes operations relating to the transfer of data to and from the recording medium 120. Furthermore, the media control unit 106 determines the transfer mode to be used for the transfer of data to and from the recording medium 120 in accordance with: the operation mode of the electronic device 100; necessary speed information from the speed designation unit 107; and card information acquired from a holding unit 110 via a communication control unit 109. The operation of the media control unit 106 for determining the transfer mode will described in detail later.

The media control unit 106 writes and reads data to and from the recording medium 120 using the determined transfer mode. The media control unit 106 outputs the read data to the control unit 103, the image processing unit 102, or the display control unit 105.

For example, the card information that the media control unit 106 acquires from the holding unit 110 of the recording medium 120 is information (supported transfer mode information) of transfer modes supported by the recording medium 120, and transfer speed information for each transfer mode. The transfer speed information includes at least one of a maximum transfer speed and a guaranteed minimum transfer speed. Note that the card information can be acquired only by means of a command that is transmitted to the recording medium 120 using the first transfer mode.

In accordance with the operation mode of the electronic device 100 that the speed designation unit 107 is notified of by the control unit 103, the speed designation unit 107 notifies the media control unit 106 of the necessary minimum transfer speed. For example, if the operation mode of the electronic device 100 is the moving-image recording mode, the speed designation unit 107 outputs, to the media control unit 106, information (necessary speed information) of the minimum transfer speed that is necessary to continue recording a moving image. The necessary minimum transfer speed may be stored in advance for each operation mode. Note that there may be one or more operation modes for which the minimum transfer speed is not set.

Next, the recording medium 120 will be described.

The holding unit 110 is a non-volatile memory that holds information (card information) regarding the recording medium 120, such as the supported transfer mode information, the transfer speed information, and storage capacity information.

A recording area 111 is a non-volatile memory for recording data.

The communication control unit 109 communicates with the media control unit 106 of the electronic device 100 to which the recording medium 120 is connected. By communicating with the media control unit 106, the communication control unit 109 outputs, to the electronic device 100, information held by the holding unit 110 and data recorded in the recording area 111. Furthermore, by communicating with the media control unit 106, the communication control unit 109 writes data input from the electronic device 100 to the recording area 111 using a designated transfer mode. Also, by communicating with the media control unit 106, the communication control unit 109 outputs data recorded in the recording area 111 to the electronic device 100 using a designated transfer mode.

Figure 2:
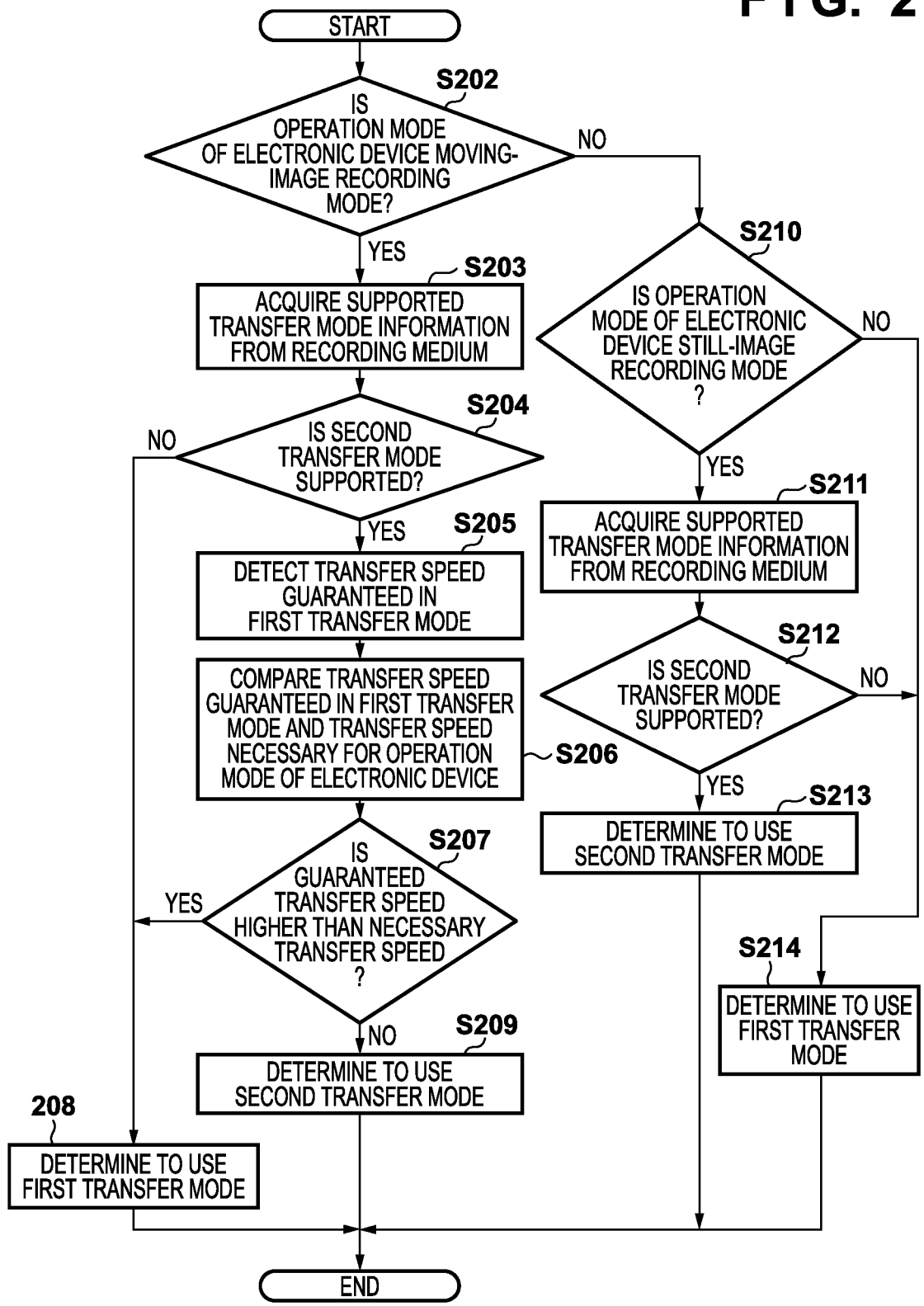
FIG. 2 is a flowchart relating to a transfer mode-determining operation according to a first embodiment.

FIG. 2 is a flowchart relating to the operation of the media control unit 106 for determining the transfer mode to be used for the communication between the electronic device 100 and the recording medium 120. While this operation may be performed at any appropriate timing, here, the operation is executed by the media control unit 106 being notified of the operation mode of the electronic device 100 by the control unit 103.

In step S202, the media control unit 106 determines whether or not the operation mode that the media control unit 106 is notified of by the control unit 103 is the moving-image recording mode. This determination corresponds to a determination of whether or not the present operation mode of the electronic device 100 is an operation mode having a necessary minimum transfer speed. The media control unit 106 executes step S203 if the operation mode is the moving-image recording mode, and executes step S210 if the operation mode is not the moving-image recording mode.

Note that, after executing step S202, the media control unit 106 may execute step S205 without executing steps S203 and S204 if the present transfer mode is the second transfer mode.

In step S203, after changing the transfer mode to the first transfer mode as necessary, the media control unit 106 acquires the supported transfer mode information from the holding unit 110 of the recording medium 120 by issuing a command requesting the supported transfer mode information to the recording medium 120. Then, the media control unit 106 executes step S204. Note that, in step S203, the media control unit 106 may acquire not only the supported transfer mode information but also the transfer speed information.

In step S204, the media control unit 106 refers to the supported transfer mode information acquired in step S203, and determines whether or not the recording medium 120 supports the second transfer mode (SD Express). The media control unit 106 executes step S205 if it is determined that the recording medium 120 supports the second transfer mode. On the other hand, the media control unit 106 executes step S208 if it is not determined that the recording medium 120 supports the second transfer mode.

In step S205, the media control unit 106 changes the transfer mode to the first transfer mode as necessary, and then issues a command requesting the transfer speed information to the recording medium 120. Note that the media control unit 106 need not execute step S205 if the media control unit 106 has already acquired the transfer speed information in step S203. Furthermore, before issuing the command requesting the transfer speed information, the media control unit 106 may increase the frequency of the clock supplied to the recording medium 120. By increasing the clock frequency, the operation speed of the recording medium 120 increases, and the time required to acquire the transfer speed information can be reduced. The media control unit 106 executes step S206 once the transfer speed information is acquired.

Note that, in step S205, the media control unit 106 may acquire only the information of the guaranteed minimum transfer speed out of the transfer speed information. Furthermore, the media control unit 106 may execute step S209 without executing steps S206 and S207 if it is determined that the present transfer mode does not have a guaranteed minimum transfer speed.

In step S206, the media control unit 106 compares the necessary minimum transfer speed when the electronic device 100 is in the moving-image recording mode and the minimum transfer speed guaranteed by the recording medium 120. In accordance with the present operation mode, a notification of the necessary minimum transfer speed in the operation mode is provided by the speed designation unit 107 to the media control unit 106. The necessary minimum transfer speed in the operation mode, in the case of the moving-image recording mode, differs depending on moving image recording settings such as the recording size (number of pixels), the bit rate, the frame rate, the compression rate, and the image-quality mode of moving images, for example.

In step S207, the media control unit 106 determines whether or not the minimum transfer speed guaranteed in the present transfer mode of the recording medium 120 is higher than the necessary minimum transfer speed in the present operation mode of the electronic device 100. Then, the media control unit 106 executes step S208 if it is determined that the guaranteed minimum transfer speed is higher than the necessary minimum transfer speed, and otherwise executes step S209.

In step S208, the media control unit 106 determines to perform the communication with the recording medium 120 using the first transfer mode.

In step S209, the media control unit 106 determines to perform the communication with the recording medium 120 using the second transfer mode.

On the other hand, if it is determined that the operation mode of the electronic device 100 is not the moving-image recording mode, the media control unit 106 determines, in step S210, whether or not the present operation mode of the electronic device 100 is the still-image recording mode. This determination corresponds to a determination of whether or not the present operation mode of the electronic device 100 is an operation mode not having a necessary minimum transfer speed. The media control unit 106 executes step S211 if it is determined that the present operation mode is the still-image recording mode, and otherwise executes step S214.

Note that, after executing step S202 or S210, the media control unit 106 may execute step S213 without executing steps S211 and S212 if the present transfer mode is the second transfer mode.

In step S211, the media control unit 106 acquires the supported transfer mode information from the holding unit 110 of the recording medium 120 by issuing a command requesting the supported transfer mode information to the recording medium 120. The media control unit 106 either outputs the acquired supported transfer mode information to the control unit 103 or stores the acquired supported transfer mode information to a memory included in the media control unit 106. Then, the media control unit 106 executes step S212.

In step S212, the media control unit 106 refers to the supported transfer mode information acquired in step S211, and determines whether or not the recording medium 120 supports the second transfer mode (SD Express). The media control unit 106 executes step S213 if it is determined that the recording medium 120 supports the second transfer mode. On the other hand, the media control unit 106 executes step S214 if it is not determined that the recording medium 120 supports the second transfer mode.

In step S213, the media control unit 106 determines to perform the communication with the recording medium 120 using the second transfer mode.

In step S214, the media control unit 106 determines to perform the communication with the recording medium 120 using the first transfer mode.

In such a manner, the media control unit 106 determines whether or not the operation mode of the electronic device 100 is an operation mode, such as the moving-image recording mode, for which there is a necessary minimum transfer speed. Furthermore, if the minimum transfer speed guaranteed by the recording medium 120 is higher than the necessary minimum transfer speed in the operation mode, the media control unit 106 determines to use the transfer mode guaranteeing the minimum transfer speed for the communication with the recording medium 120. Thus, interruption of recording and playback attributable to transfer speed can be suppressed.

On the other hand, the media control unit 106 determines to use the transfer mode having the highest transfer speed among the transfer modes supported by the recording medium 120 for the communication with the recording medium 120 if:

the minimum transfer speed guaranteed by the recording medium 120 is not higher than the necessary minimum transfer speed in the operation mode;

there is no minimum transfer speed guaranteed by the recording medium 120; or the operation mode of the electronic device 100 is an operation mode, such as the still-image recording mode, for which there is no necessary minimum transfer speed.

Thus, full use can be made of the ability of the recording medium 120.

Note that, while the moving-image recording mode and the still-image recording mode have been respectively used here as an operation mode having a necessary minimum transfer speed and an operation mode not having a necessary minimum transfer speed, these are mere example. It may be determined, as appropriate, for each electronic device 100 whether or not a necessary minimum transfer speed is to be associated with an operation mode. For example, a necessary minimum transfer speed may be associated with the playback mode in order to prevent interruption of playback. Furthermore, even for the still-image recording mode, a configuration may be adopted such that a necessary minimum transfer speed is associated with a consecutive shooting mode, and a necessary minimum transfer speed is not associated with a single shooting mode.

Furthermore, in this embodiment, an operation mode of the electronic device 100 and a necessary minimum transfer speed are associated with one another, and a transfer mode is determined in accordance an operation mode. However, a configuration may be adopted in which a necessary minimum transfer speed is associated with the purpose of use, characteristic, etc., of data recorded (written) to or played back (read) from the recording medium 120, and a transfer mode is determined in accordance with the purpose of use and characteristic of data. Examples of the purpose of use and characteristic of data played back (read) include the playback frame rate, data format (whether or not encoding is performed), encoding method, resolution, etc., of moving-image data, but there is no limitation to these examples.

Furthermore, the card information of the recording medium 120, which includes the supported transfer mode information and the transfer speed information, may be acquired upon connection of the recording medium 120. Accordingly, if the supported transfer mode information and the transfer speed information of the recording medium 120 have already been acquired when the operation described with reference to the flowchart in FIG. 2 is started, the steps for acquiring such information may be omitted. Specifically, steps S203, S205, and S211 may be omitted.

According to this embodiment, the transfer mode to be used for communication with a recording medium having a plurality of transfer modes with different transfer-speed characteristics is determined in accordance with the operation mode of the electronic device and the minimum transfer speed guaranteed by the recording medium. Thus, both stable recording/playback of data and utilization of the transfer capability of the recording medium can be achieved.

Second Embodiment

Next, a second embodiment of the present invention will be described. This embodiment can be implemented using the electronic device 100 and the recording medium 120 described in the first embodiment. Accordingly, description will be provided focusing on the differences from the first embodiment.

In the first embodiment, an operation in which the media control unit 106 determines a transfer mode in response to being notified of the operation mode of the electronic device 100 from the control unit 103 was described. In this embodiment, the operation is executed upon activation of the electronic device 100 in a state in which the recording medium 120 is connected thereto, or upon connection of the recording medium 120 to the already-activated electronic device 100.

Figure 3:
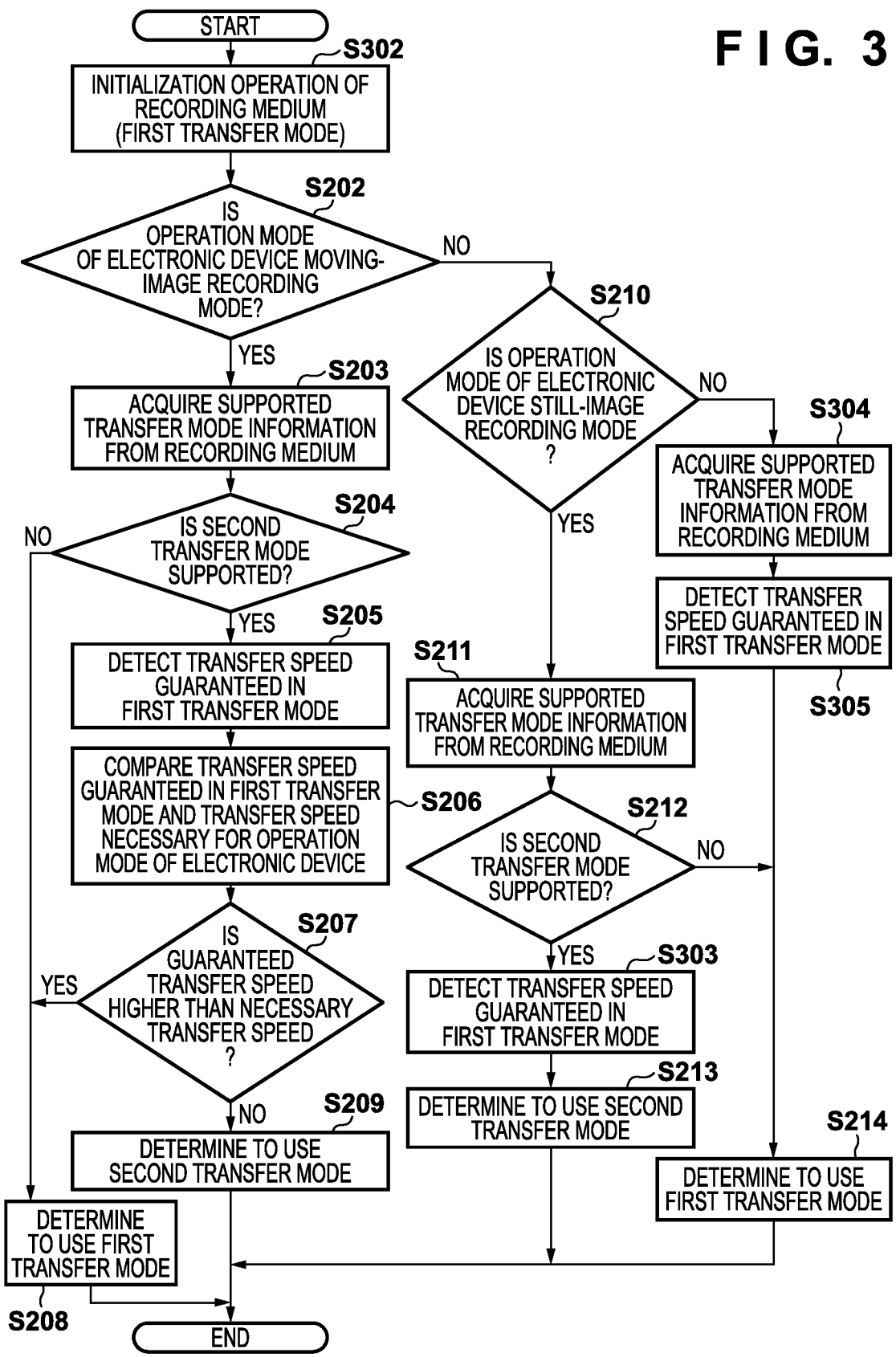
FIG. 3 is a flowchart relating to a transfer mode-determining operation according to a second embodiment.

FIG. 3 is a flowchart relating to the operation of the media control unit 106 for determining the transfer mode to be used for the communication between the electronic device 100 and the recording medium 120 in this embodiment. The same reference numerals as those in FIG. 2 are appended to steps in which the same operation as that performed in the first embodiment is performed, and description thereof is omitted. As discussed above, this operation is executed upon activation of the electronic device 100 having the recording medium 120 connected thereto, or upon connection of the recording medium 120 to the already-activated electronic device 100.

In step S302, the media control unit 106 executes initialization of the operation of the recording medium 120. The initialization of the operation of the recording medium 120 may be performed by issuing an initialization command from the media control unit 106, for example. Furthermore, the media control unit 106 sets the transfer mode of the recording medium 120 to the first transfer mode (SD mode) upon initializing the operation of the recording medium 120.

Note that the initialization of the operation of the recording medium 120 differs from the initialization (formatting) of the recording area 111. For example, the initialization of the operation of the recording medium 120 is executed for the purpose of checking the operation of the recording medium 120, etc.

In step S202, the media control unit 106 determines whether or not the operation mode of the electronic device 100 is the moving-image recording mode. The media control unit 106 executes step S203 if the operation mode is the moving-image recording mode, and executes step S210 if the operation mode is not the moving-image recording mode.

The operation following step S203 in a case in which the operation mode of the electronic device 100 was the moving-image recording mode is the same as that in the first embodiment, and thus description thereof is omitted.

In this embodiment, the media control unit 106 acquires the supported transfer mode information and the transfer speed information from the recording medium 120 even if the operation mode of the electronic device 100 is not the moving-image recording mode.

If it is determined in step S212 that the recording medium 120 supports the second transfer mode, the media control unit 106 executes step S303 before determining the transfer mode in step S214, and acquires the transfer speed information in a similar manner as in step S205. The media control unit 106 either outputs the acquired transfer speed information to the control unit 103 or stores the acquired transfer speed information to the memory included in the media control unit 106.

Furthermore, if it is determined in step S210 that the operation mode of the electronic device 100 is not the still-image recording mode, the media control unit 106 executes steps S304 and S305 before executing step S214. In step S304, the media control unit 106 acquires the supported transfer mode information from the recording medium 120 in a similar manner as in step S203. In step S305, the media control unit 106 acquires the transfer speed information from the recording medium 120 in a similar manner as in step S205.

By acquiring the supported transfer mode information and the transfer speed information in advance while the first transfer mode is used even if the operation mode is not the moving-image recording mode in such a manner, such information can be used if necessary while the second transfer mode is being used. As discussed above, the card information can be acquired only using the first transfer mode. Accordingly, if the card information becomes necessary while the second transfer mode is being used, it is necessary to switch to the first transfer mode to acquire the card information and then switch back to the second transfer mode. The operation of the recording medium needs to be initialized to switch the transfer mode of the recording medium, and the initialization of operation is not negligible because the initialization takes several hundred microseconds each time.

For example, if the operation mode switches to the moving-image recording mode from a state in which the second transfer mode is being used in the still-image recording mode, the first transfer mode needs to be used to execute steps S203 and S205. By acquiring the card information in advance using the first transfer mode upon activation of the electronic device 100 or upon connection of the recording medium 120 as in this embodiment, there is no need to switch to the first transfer mode to acquire the card information even if the second transfer mode is subsequently used.

Furthermore, in a case in which the second transfer mode is used in the moving-image recording mode, it becomes unnecessary to switch back to the second transfer mode in step S209 from a state in which switching to the first transfer mode has been performed to execute step S205.

Accordingly, even in a case in which the operation mode switches to the moving-image recording mode from a state in which the second transfer mode is being used in the still-image recording mode, the transfer mode to be used can be quickly determined and the time until a moving image can be recorded can be reduced.

In this embodiment, the supported transfer mode information and the transfer speed information are first acquired from the recording medium using the first transfer mode upon activation of the electronic device or upon connection of the recording medium. Thus, in addition to the effects of the first embodiment being achieved, the switching of transfer mode for acquiring the supported transfer mode information and the transfer speed information can be omitted, and the operation speed of the electronic device can be increased.

Third Embodiment

Next, a third embodiment of the present invention will be described. While an operation for determining the transfer mode during recording was mainly described in the first and second embodiments, this embodiment relates to an operation for determining the transfer mode during playback. This embodiment can be implemented using the electronic device 100 and the recording medium 120 described in the first embodiment. Accordingly, description will be provided focusing on the differences from the first embodiment.

Figure 4:
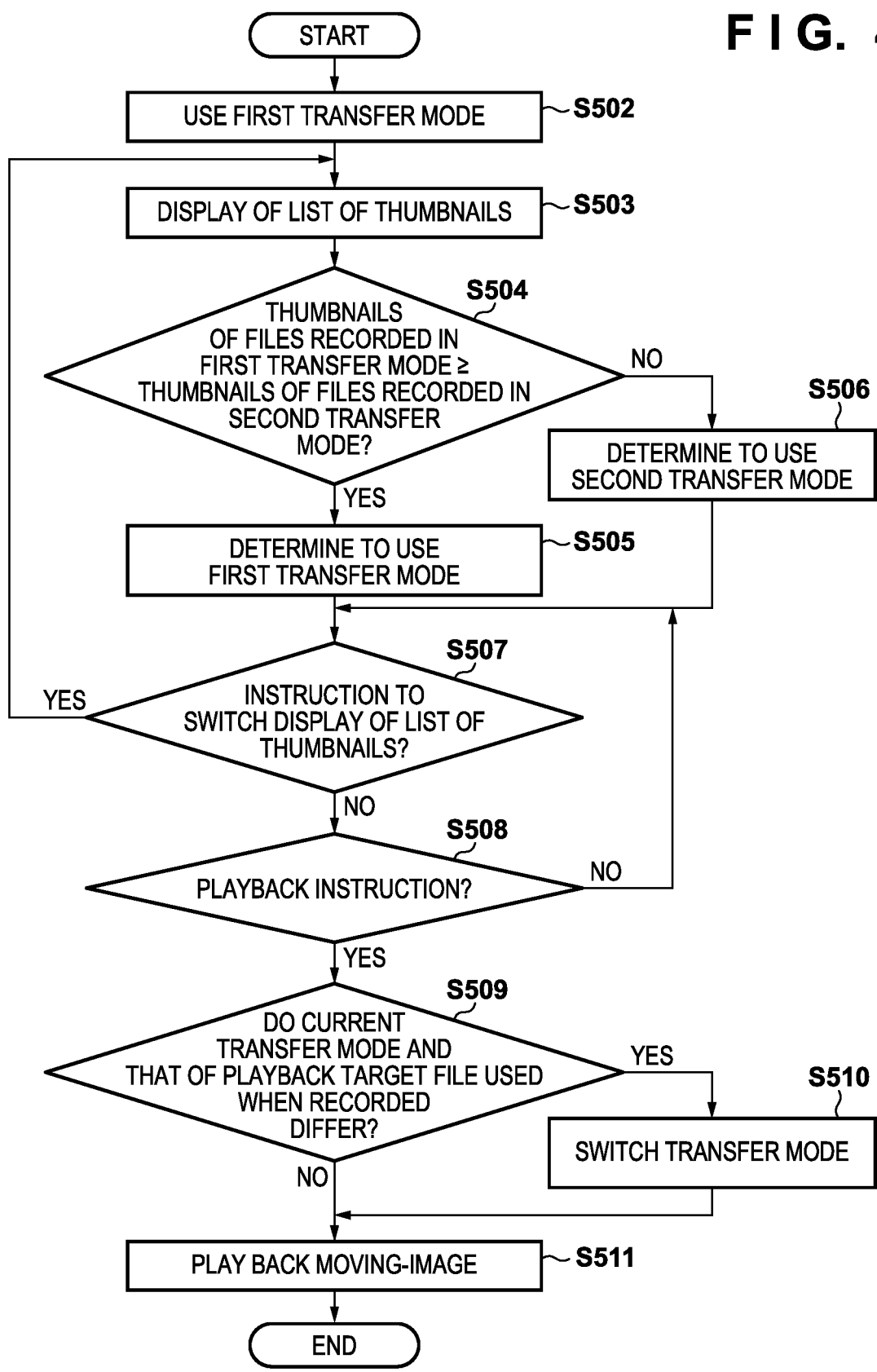
FIG. 4 is a flowchart relating to a transfer mode-determining operation according to a third embodiment.

FIG. 4 is a flowchart relating to the operation of the media control unit 106 for determining the transfer mode to be used in the communication between the electronic device 100 and the recording medium 120 in this embodiment. For example, this operation may be executed when the operation mode of the electronic device 100 is switched to the playback mode via the operation unit 108. The control unit 103 switches the operation mode of the electronic device 100 to the playback mode upon detecting an operation for switching the operation mode to the playback mode. Furthermore, the control unit 103 notifies the media control unit 106 and the speed designation unit 107 of the switch to the playback mode.

In step S502, upon being notified by the control unit 103 of the switch to the playback mode, the media control unit 106 sets the transfer mode to be used for the communication with the recording medium 120 to the first transfer mode. The media control unit 106 executes an operation for switching to the first transfer mode if the second transfer mode was being used upon receiving the notification from the control unit 103, and keeps using the same transfer mode if the first transfer mode was being used. Next, the media control unit 106 executes step S503.

In step S503, the media control unit 106 reads, from the recording medium 120, thumbnail-view image data of moving-image files recorded on the recording medium 120, and outputs the thumbnail-view image data to the image processing unit 102. For example, moving-image files can be determined from file extensions. Furthermore, the media control unit 106 reads, from the recording medium 120 along with the thumbnail-view image data, information of the transfer mode used to record the moving-image files. Information of the transfer mode used during recording is recorded as information accompanying moving-image data.

The information of the transfer mode used during recording is associated with the moving-image file names or the file names of the thumbnail-view image data and is stored to the internal memory of the media control unit 106. Alternatively, the media control unit 106 may output such information to the control unit 103. The control unit 103 stores the information received from the media control unit 106 to the internal RAM.

The image processing unit 102 generates data of a GUI screen in which the thumbnail-view image data is displayed as a list in a predetermined layout, and outputs the data to the display control unit 105. The display control unit 105 displays a list display screen of thumbnails in a selectable state on the display unit 104. The list display screen is a screen for selecting data to be read from among data recorded on the recording medium 120.

Figure 5A:
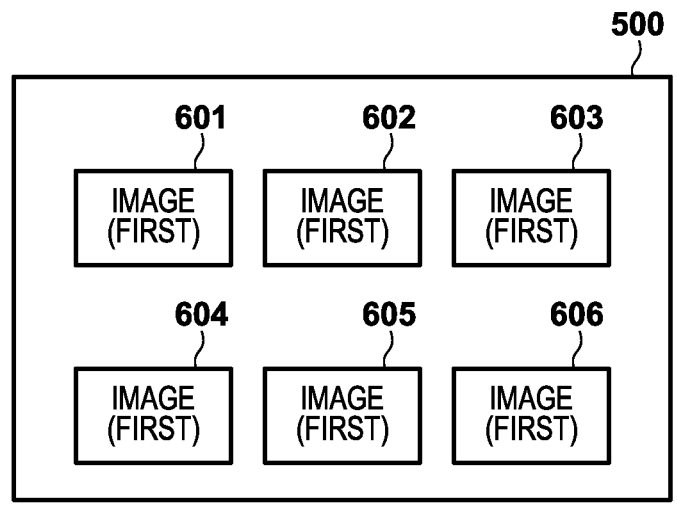
FIGS. 5A to 5C are diagrams illustrating examples of display performed by the electronic device according to the embodiments.
Figure 5B:
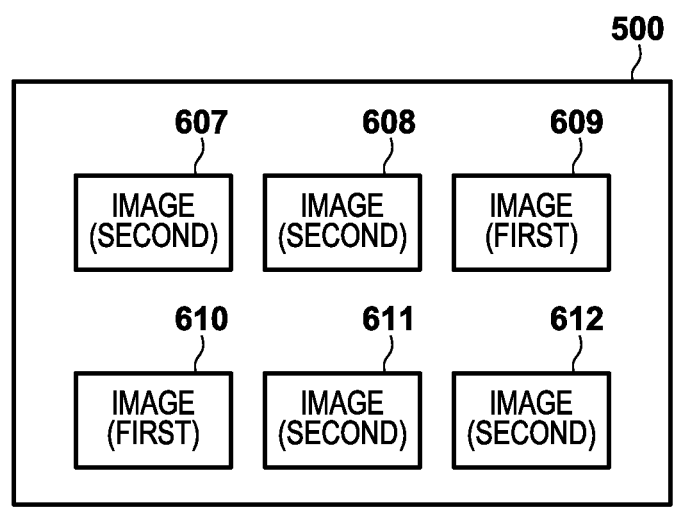

FIGS. 5A and 5B are each an example of a thumbnail list display screen 500. The list display screen 500 may be displayed over the entire display unit 104 or in a partial area of the display unit 104. While examples in which six thumbnails are displayed in a listed state in one screen are illustrated here, the number of thumbnail images per one screen may be set as appropriate. Furthermore, in a case in which all of the thumbnail images to be displayed cannot be displayed in one screen, the thumbnail images can be displayed using well-known methods such as forming the list display screen 500 from multiple pages or using scrolling display.

FIG. 5A illustrates a case in which thumbnails 601 to 606 are all thumbnails of moving-image files recorded using the first transfer mode. Furthermore, FIG. 5B illustrates a case in which thumbnails 609 and 610 are thumbnails of moving-image files recorded using the first transfer mode, and thumbnails 607, 608, 611, and 612 are thumbnails of moving-image files recorded using the second transfer mode.

For the thumbnails displayed on the list display screen 500, in step S504, the media control unit 106 performs a comparison between the number of thumbnails of moving-image files recorded using the first transfer mode and the number of thumbnails of moving-image files recorded using the second transfer mode. This comparison corresponds to an operation for determining the transfer mode likely to be used during playback of moving-image files whose thumbnails are displayed on the list display screen 500. Note that, even if only some of the read thumbnails are displayed on the list display screen 500, the comparison is performed with respect to the thumbnails displayed on the list display screen 500.

The media control unit 106 executes step S505 if the number of thumbnails of moving-image files recorded using the first transfer mode is more than or equal to the number of thumbnails of moving-image files recorded using the second transfer mode. Furthermore, the media control unit 106 executes step S506 if the number of thumbnails of moving-image files recorded using the first transfer mode is less than the number of thumbnails of moving-image files recorded using the second transfer mode. Accordingly, the media control unit 106 executes step S505 in the example illustrated in FIG. 5A, and executes step S506 in the example illustrated in FIG. 5B.

In step S505, the media control unit 106 determines the first transfer mode as the transfer mode to be used for the communication with the recording medium 120. If the second transfer mode is being used at this time point, the media control unit 106 executes an operation for switching to the first transfer mode. The display of the list of thumbnails on the display unit 104 is continued even if the transfer mode is switched. Next, the media control unit 106 executes step S507.

In step S506, the media control unit 106 determines the second transfer mode as the transfer mode to be used for the communication with the recording medium 120. If the first transfer mode is being used at this time point, the media control unit 106 executes an operation for switching to the second transfer mode. The display of the list of thumbnails on the display unit 104 is continued even if the transfer mode is switched.

While the switching of transfer mode requires several hundred milliseconds for processing by the recording medium 120, the user would not recognize the switching of transfer mode because the switching of transfer mode is performed simultaneously with the display of the list of thumbnails on the display unit 104.

In step S507, the control unit 103 determines whether or not an instruction to switch the list display screen 500 has been detected via the operation unit 108 (includes the touchpanel of the display unit 104). The switching instruction may vary depending on the form in which the list display screen 500 is displayed, and may be a page skipping or page returning instruction, a scroll instruction, etc. If it is determined that an instruction to switch the list display screen 500 has been detected, the control unit 103 instructs the image processing unit 102 to generate data of a list display screen 500 that is in accordance with the switching instruction. Thus, step S503 is executed again, and the image processing unit 102 generates data of a list display screen 500 for the next or previous page or a scrolled list display screen 500, and outputs the data to the display control unit 105.

On the other hand, the control unit 103 executes step S508 if it is not determined that an instruction for switching the list display screen 500 has been detected.

In step S508, the control unit 103 determines whether or not a playback instruction for a thumbnail displayed on the list display screen 500 has been detected via the operation unit 108 (includes the touchpanel of the display unit 104). For example, the playback instruction may be an operation of selecting a thumbnail. The selection operation may be a touch operation on the display unit 104, or may be a combination of a key operation and a button operation performed on the operation unit 108.

If it is determined that a playback instruction for a displayed thumbnail has been detected, the control unit 103 notifies the media control unit 106 of the thumbnail for which a playback instruction has been issued or identification information of the moving-image file for which a playback instruction has been issued. Furthermore, the control unit 103 executes step S507 if it is not determined that a playback instruction for a displayed thumbnail has been detected.

In step S509, the media control unit 106 determines whether or not the transfer mode used to record the moving-image file for which a playback instruction has been issued and the presently used transfer mode differ. The media control unit 106 executes step S510 if it is determined that the transfer modes differ, and executes step S511 if it is determined that the transfer modes are the same.

In step S510, the media control unit 106 switches the transfer mode to be used for the communication between the electronic device 100 and the recording medium 120 so as to match the transfer mode used to record the moving-image file for which a playback instruction has been issued. Then, the media control unit 106 executes step S511.

In step S511, the media control unit 106 reads, from the recording medium 120, the moving-image file for which a playback instruction was issued by the user in step S508, and outputs the moving-image file to the image processing unit 102. The image processing unit 102 decodes the moving-image data stored in the image file to generate display moving-image data, and outputs the display moving-image data to the display control unit 105. The display control unit 105 displays the moving image on the display unit 104.

For example, if the second transfer mode is used to play back a moving image that was recorded using the first transfer mode, the playback of the moving image may be interrupted because no minimum transfer speed is guaranteed in the second transfer mode. Furthermore, there is a possibility that a moving image that was recorded using the second transfer mode cannot be played back smoothly using the first transfer mode because the moving image might have been recorded at a speed higher than the maximum transfer speed of the first transfer mode. The possibility of such problems occurring can be reduced in this embodiment because the transfer mode used during recording is used in a case in which a moving-image file recorded on the recording medium 120 is played back.

Furthermore, switching to a transfer mode likely to be used during playback is performed in advance before a playback instruction for a moving-image file whose thumbnail is displayed in a list is provided. Thus, a delay in the start of playback that would otherwise occur as a result of the switching of transfer mode being performed after a playback instruction is accepted can be suppressed. Furthermore, by performing the switching of transfer mode simultaneously with the display of thumbnails, the switching of transfer mode can be executed without being recognized by the user.

Note that the transfer mode to be used during playback can be determined based on information other than the transfer modes used during recording. For example, bit-rate information of moving-image files may be acquired, and the transfer mode to be used during playback may be determined based on the transfer speed necessary to play back moving-image files smoothly.

For example, in step S504, the media control unit 106 determines whether or not the number of moving-image files for which the transfer speed necessary for playback is lower than the minimum transfer speed guaranteed in the first transfer mode is more than or equal to half the number of moving-image files whose thumbnails are displayed. Furthermore, the media control unit 106 determines to use the first transfer mode in step S505 if it is determined that the number of moving-image files for which the transfer speed necessary for playback is lower than the minimum transfer speed guaranteed in the first transfer mode is more than or equal to half the number of moving-image files whose thumbnails are displayed. On the other hand, the media control unit 106 determines to use the second transfer mode in step S506 if it is not determined that the number of moving-image files for which the transfer speed necessary for playback is lower than the minimum transfer speed guaranteed in the first transfer mode is more than or equal to half the number of moving-image files whose thumbnails are displayed. The above-described effects can be realized by such an operation as well.

Fourth Embodiment

Next, a fourth embodiment of the present invention will be described. Similar to the third embodiment, this embodiment also relates to an operation for determining the transfer mode during playback. Furthermore, this embodiment can be implemented using the electronic device 100 and the recording medium 120 described in the first embodiment. Accordingly, description will be provided focusing on the differences from the third embodiment.

In this embodiment, the time required to switch between the two transfer modes differs depending on the direction in which the switching is performed.

Figure 6:
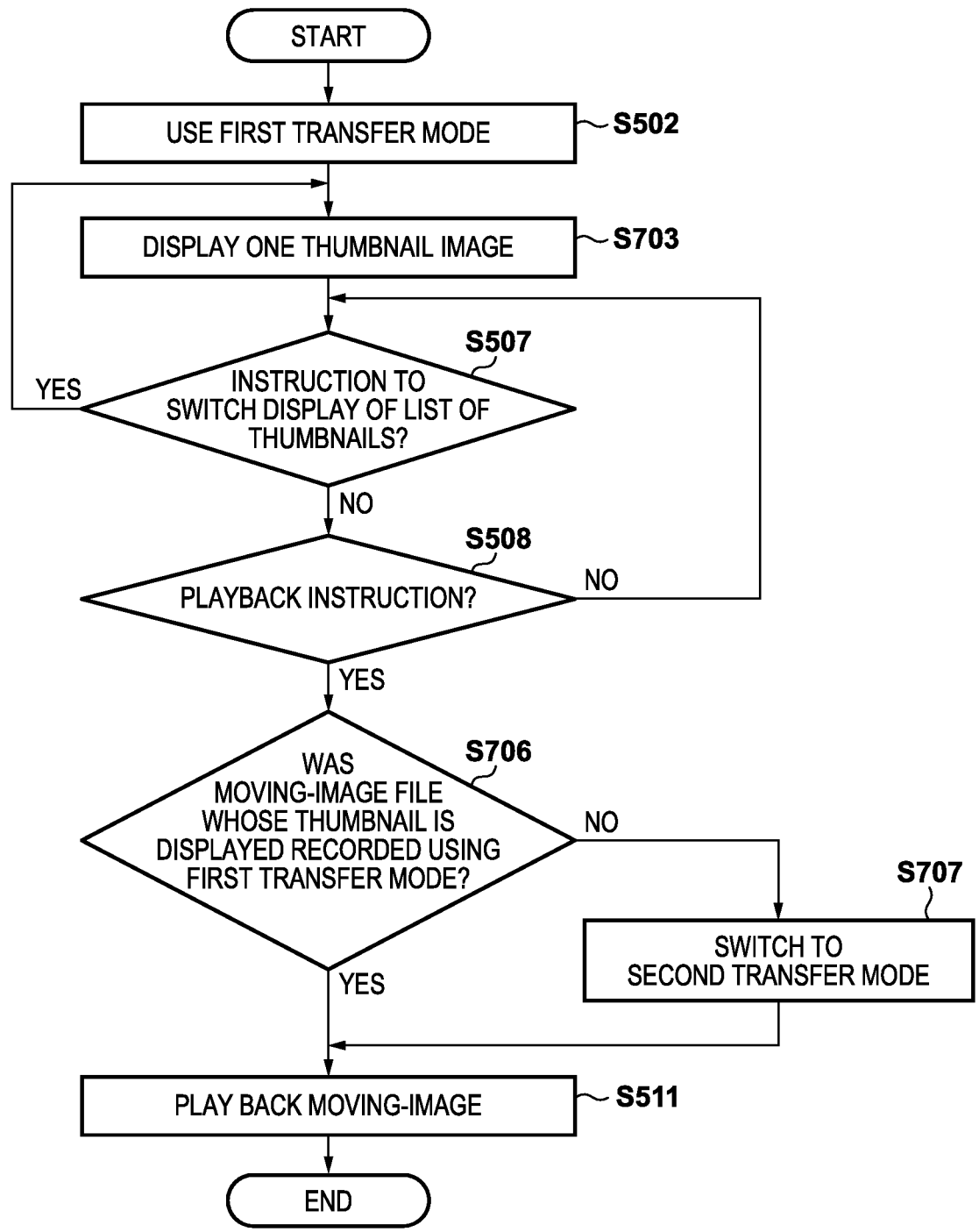
FIG. 6 is a flowchart relating to a transfer mode-determining operation according to a fourth embodiment.

FIG. 6 is a flowchart relating to the operation of the media control unit 106 for determining the transfer mode to be used in the communication between the electronic device 100 and the recording medium 120 in this embodiment. The same reference numerals are appended to steps in which the same operation as that performed in the third embodiment is performed. As is the case with the third embodiment, this operation may be executed when the operation mode of the electronic device 100 is switched to the playback mode via the operation unit 108, for example.

In step S502, upon being notified by the control unit 103 of the switch to the playback mode, the media control unit 106 sets the transfer mode to be used for the communication with the recording medium 120 to the first transfer mode. The media control unit 106 executes an operation for switching to the first transfer mode if the second transfer mode was being used upon receiving the notification from the control unit 103, and keeps using the same transfer mode if the first transfer mode was being used. Next, the media control unit 106 executes step S703.

Here, the time required to switch from the first transfer mode to the second transfer mode is shorter than the time required to switch from the second transfer mode to the first transfer mode. Thus, the first transfer mode is used in step S502. If the time required to switch from the second transfer mode to the first transfer mode is shorter, the second transfer mode is used in step S502.

In step S703, the media control unit 106 reads, from the recording medium 120, thumbnail-view image data of moving-image files recorded on the recording medium 120, and outputs the thumbnail-view image data to the image processing unit 102. Furthermore, the media control unit 106 reads, from the recording medium 120 along with the thumbnail-view image data, information of the transfer mode used to record the moving-image files.

Furthermore, the information of the transfer mode used during recording is associated with the moving-image file names or the file names of the thumbnail-view image data and is stored to the internal memory of the media control unit 106. Alternatively, the media control unit 106 may output such information to the control unit 103. The control unit 103 stores the information received from the media control unit 106 to the internal RAM.

Figure 5C:
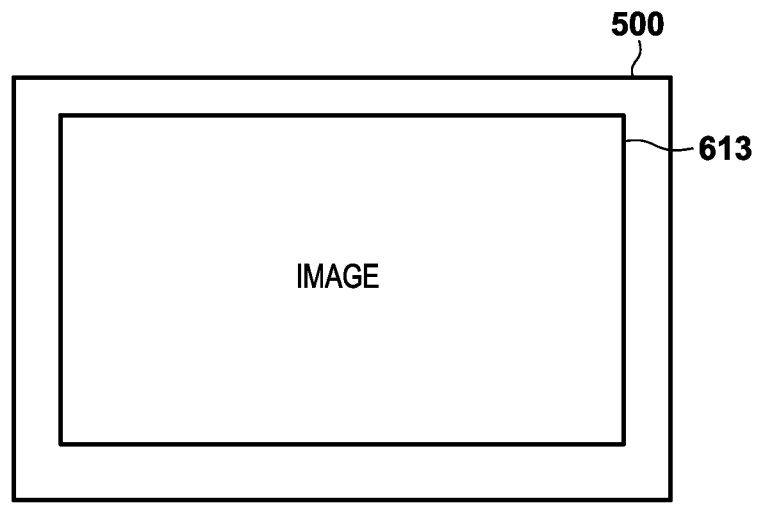

The image processing unit 102 generates data of a thumbnail-view screen in a similar manner as in step S503. However, in this embodiment, the image processing unit 102 generates data of a screen for displaying one thumbnail 613 in one screen as illustrated in FIG. 5C.

Subsequently, the control unit 103 executes steps S507 and S508 in a similar manner as in the third embodiment.

In step S706, the media control unit 106 determines whether or not the transfer mode used to record the moving-image file whose thumbnail is displayed was the first transfer mode, and executes step S511 if it is determined that the first transfer mode was used and executes step S707 if it is not determined that the first transfer mode was used. Note that, if a configuration is adopted such that the second transfer mode is used in step S502, the media control unit 106 determines in step S706 whether or not the transfer mode used to record the moving-image file whose thumbnail is displayed was the second transfer mode. The branching in accordance with the result of the determination does not change.

In step S707, the media control unit 106 switches the transfer mode to be used for the communication between the electronic device 100 and the recording medium 120 to the second transfer mode. The switching of transfer mode is executed simultaneously with the display of a thumbnail. Then, the media control unit 106 executes step S511. Note that, if a configuration is adopted such that the second transfer mode is used in step S502, the transfer mode is switched to the first transfer mode in step S707.

In step S511, the media control unit 106 reads, from the recording medium 120, the moving-image file for which a playback instruction was issued by the user in step S508, and outputs the moving-image file to the image processing unit 102. The image processing unit 102 decodes the moving-image data stored in the image file to generate display moving-image data, and outputs the display moving-image data to the display control unit 105. The display control unit 105 displays the moving image on the display unit 104.

In this embodiment, the initially used transfer mode is determined taking the time required to switch the transfer mode to be used for the communication between the media control unit 106 and the recording medium 120 into consideration. Specifically, the transfer mode is determined so that the transfer mode requiring a longer time to switch to and use the transfer mode is initially used. This embodiment differs from the third embodiment in that the switching of transfer mode may occur after a playback instruction is accepted because the switching of transfer mode is not performed before a playback instruction is accepted; however, the delay occurring in such a case can be reduced according to this embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-008939, filed on Jan. 22, 2021, which is hereby incorporated by reference herein in its entirety.

What is claimed is:

1. An electronic device that can perform communication with a recording medium that has a first transfer mode in which a minimum transfer speed is guaranteed, and a second transfer mode in which a minimum transfer speed is not guaranteed and a higher transfer speed than the minimum transfer speed in the first mode is capable, the electronic device comprising:
a controller that communicates with a connected recording medium; and
one or more processors that execute a program and thereby function as
a determination unit that determines a transfer mode to be used by the controller for the communication,
wherein:
the determination unit first determines whether the connected recording medium supports the second transfer mode, and performs a comparison between the minimum transfer speed in the first mode and a necessary transfer speed; and
if determined that the connected recording medium supports the second transfer mode, directs the use of the first transfer mode as the transfer mode when the minimum transfer speed is higher than the necessary transfer speed for data that is to be recorded through the communication with the recording medium, and directs the use of the second transfer mode as the transfer mode when the minimum transfer speed is not higher than the necessary transfer speed; and
if determined that the connected recording medium does not support the second transfer mode, the determination unit directs the use of the first transfer mode as the transfer mode.

2. The electronic device according to claim 1, wherein the necessary transfer speed is associated with an operation mode of the electronic device, and, if the connected recording medium supports the second transfer mode, the determination unit performs the determination of the transfer mode in accordance with operation modes of the electronic device.

3. The electronic device according to claim 2, wherein the electronic device has an operation mode with which the necessary transfer speed is associated and an operation mode with which the necessary transfer speed is not associated.

4. The electronic device according to claim 3, wherein, if the electronic device is in an operation mode with which the necessary transfer speed is not associated, the determination unit determines to use the second transfer mode as the transfer mode when the connected recording medium supports the second transfer mode, and determines to use the first transfer mode as the transfer mode when the connected recording medium does not support the second transfer mode.

5. The electronic device according to claim 1,
wherein information regarding the minimum transfer speed can be acquired from the recording medium only using the first transfer mode, and
the determination unit acquires the information from the recording medium and stores the acquired information while the controller is using the first transfer mode, and uses the stored information if the information becomes necessary while the controller is using the second transfer mode.

6. The electronic device according to claim 5, wherein the controller uses the first transfer mode upon activation of the electronic device or the connection of the recording medium to the electronic device.

7. The electronic device according to claim 1, wherein, as the transfer mode to be used by the controller for reading data from the recording medium, the determination unit determines a transfer mode that is the same as the transfer mode that was used by the controller when the data was recorded to the recording medium.

8. The electronic device according to claim 7,
wherein the electronic device displays, on a display device, a screen for selecting data to be read from the recording medium, and
the determination unit determines the transfer mode based on the transfer mode that was used to record data displayed on the screen, and performs switching of the transfer mode simultaneously with the display of the screen if the determined display mode differs from the presently used transfer mode.

9. The electronic device according to claim 8, wherein the determination unit determines, as the transfer mode, the transfer mode that was used to record a larger quantity of data items among a plurality of data items displayed on the screen.

10. The electronic device according to claim 8, wherein, if the transfer mode that was used to record data selected from the screen differs from the determined transfer mode, the determination unit switches the transfer mode so that the transfer mode that was used to record the selected data is used.

11. The electronic device according to claim 7, wherein, if there is a difference between the time required to switch from the first transfer mode to the second transfer mode and the time required to switch from the second transfer mode to the first transfer mode, a screen for selecting data to be read from the recording medium is displayed on a display device after the transfer mode requiring a longer time to switch to and use the transfer mode is set and used.

12. The electronic device according to claim 1, wherein the first transfer mode is an SD mode, and the second transfer mode is a PCIe mode.

13. The electronic device according to claim 1,
wherein an operation mode of the electronic device can be switched, and
in a case in which the operation mode of the electronic device is a first mode:
if the connected recording medium supports the second transfer mode, the determination unit determines the use of the first transfer mode as the transfer mode when the minimum transfer speed is higher than a necessary transfer speed for data that is to be recorded through the communication with the recording medium, and determines the use of the second transfer mode as the transfer mode when the minimum transfer speed is not higher than the necessary transfer speed; and
if the connected recording medium does not support the second transfer mode, the determination unit determines the use of the first transfer mode as the transfer mode, and
in a case in which the operation mode of the electronic device is a second mode:
if the connected recording medium supports the second transfer mode, the determination unit determines the use of the second transfer mode as the transfer mode; and
if the connected recording medium does not support the second transfer mode, the determination unit determines the use of the first transfer mode as the transfer mode.

14. The electronic device according to claim 13, wherein the first mode is a moving-image recording mode, and the second mode is a still-image recording mode.

15. The electronic device according to claim 14, wherein the determination unit determines the use of the first transfer mode as the transfer mode if the operation mode of the electronic device is a playback mode for playing back an image.

16. The electronic device according to claim 1,
wherein:
if an operation mode of the electronic device is a recording mode, the determination unit determines the transfer mode to be used for the communication in accordance with a result of a determination as to whether or not the connected recording medium supports the second transfer mode; and
if the operation mode the electronic device is a playback mode, the determination unit determines the use of the first transfer mode as the transfer mode.

17. The electronic device according to claim 16,
wherein, in a case in which the operation mode of the electronic device is a recording mode:
if the connected recording medium supports the second transfer mode, the determination unit determines the use of the first transfer mode as the transfer mode when the minimum transfer speed is higher than a necessary transfer speed for data that is to be recorded through the communication with the recording medium, and determines the use of the second transfer mode as the transfer mode when the minimum transfer speed is not higher than the necessary transfer speed; and
if the connected recording medium does not support the second transfer mode, the determination unit determines the use of the first transfer mode as the transfer mode.

18. The electronic device according to claim 16,
wherein, in a case in which the electronic device operates in the playback mode:
the determination unit determines the use of the first transfer mode as the transfer mode upon activation of the electronic device or connection of the recording medium to the electronic device; and
the determination unit determines the transfer mode to be used for the communication in accordance with a played-back image.

19. A control method for an electronic device that can perform communication with a recording medium that has a first transfer mode in which a minimum transfer speed is guaranteed, and a second transfer mode in which a minimum transfer speed is not guaranteed and a higher transfer speed than the minimum transfer speed in the first mode is capable, the control method comprising:
directing a transfer mode to be used for the communication with a connected recording medium, and determining whether the connected recording medium supports the second transfer mode, and performing a comparison between the minimum transfer speed in the first mode is higher than a necessary transfer speed;
wherein the determining includes:
if determined that the connected recording medium supports the second transfer mode, directing the use of the first transfer mode as the transfer mode when the minimum transfer speed is higher than a necessary transfer speed for data that is to be recorded through the communication with the recording medium, and directing the use of the second transfer mode as the transfer mode when the minimum transfer speed is not higher than the necessary transfer speed; and
if determined that the connected recording medium does not support the second transfer mode, directing the use of the first transfer mode as the transfer mode.

20. A non-transitory computer-readable storage medium having stored therein a program for causing a computer to execute each step of a control method for an electronic device that can perform communication with a recording medium that has a first transfer mode in which a minimum transfer speed is guaranteed, and a second transfer mode in which a minimum transfer speed is not guaranteed and a higher transfer speed than the minimum transfer speed in the first mode is capable, the control method comprising:
directing a transfer mode to be used for the communication with a connected recording medium, and determining whether the connected recording medium supports the second transfer mode, and performing a comparison between the minimum transfer speed in the first mode is higher than a necessary transfer speed;
wherein the determining includes:
if determined that the connected recording medium supports the second transfer mode, directing the use of the first transfer mode as the transfer mode when the minimum transfer speed is higher than a necessary transfer speed for data that is to be recorded through the communication with the recording medium, and directing the use of the second transfer mode as the transfer mode when the minimum transfer speed is not higher than the necessary transfer speed; and if determined that the connected recording medium does not support the second transfer mode, directing the use of the first transfer mode as the transfer mode.

* * * * *